United States Patent [19]

Decker et al.

[11] 4,158,721
[45] Jun. 19, 1979

[54] GLASS-TO-METAL SEAL FOR ELECTROCHEMICAL CELLS

[75] Inventors: John J. Decker; Donald J. Kantner, both of Emporium, Pa.

[73] Assignee: GTE Sylvania Incorporated, Stamford, Conn.

[21] Appl. No.: 905,090

[22] Filed: May 11, 1978

[51] Int. Cl.² .................................. H01M 2/08
[52] U.S. Cl. ........................ 429/174; 429/184
[58] Field of Search ........... 429/174, 185, 180, 181, 429/184

[56] References Cited

U.S. PATENT DOCUMENTS

| | | | |
|---|---|---|---|
| 3,416,964 | 12/1968 | Michalko | 429/181 X |
| 3,840,408 | 10/1974 | Bondley | 429/181 |
| 4,006,282 | 2/1977 | Antoine | 429/181 |
| 4,048,392 | 9/1977 | Garoutte | 429/181 X |

Primary Examiner—Charles F. LeFevour
Attorney, Agent, or Firm—William H. McNeill

[57] ABSTRACT

A glass-to-metal seal for an electrochemical cell terminal includes a formed apertured plate and a tack-shaped terminal pin. The formed apertured plate has a relief ring of concavo-convex configuration and the terminal pin has the vertical section thereof within the aperture and the horizontal section spaced away from the plate. A glass seal is formed between the relief ring and about the terminal pin, including the space between the horizontal section and the plate by the application of heat and pressure within a carbon mold.

3 Claims, 4 Drawing Figures

GLASS-TO-METAL SEAL FOR ELECTROCHEMICAL CELLS

BACKGROUND OF THE INVENTION

This invention relates generally to glass-to-metal seals and more particularly to seals for electrochemical cell terminals.

Such seals have heretofore been employed by sealing a thin terminal pin within a portion of an electrochemical cell body. The purpose of the seal, besides the obvious one of sealing, is to electrically isolate the positive and negative terminals of the cell. While these seals perform more or less adequately under normal conditions, in cases of rough usage or cell expansion by reason of shorting, the seals often fracture allowing the escape of the corrosive electrolyte contained therein. Further, the small diameter of the terminal pin has often led to difficulties in making good electrical contact in end use devices.

OBJECTS AND SUMMARY OF THE INVENTION

It is therefore an object of the invention to obviate the disadvantages of the prior art.

It is another object of the invention to enhance electrochemical seals.

A further object of the invention is the provision of a terminal pin having a relatively large contact area.

Yet another object of the invention is the provision of a glass-to-metal seal having increased resistance to breakage.

These objects are accomplished in one aspect of the invention by the provision of a glass-to-metal seal for a terminal which comprises an apertured metal plate having a terminal pin substantially centrally located within said aperture and held therein by a glass seal. The aperture in the plate is surrounded by a concavo-convex relief ring the walls of which define the boundaries of the glass seal on one side of the plate. On the opposite side of the plate the terminal pin is provided with a broadened area which is spaced from the plate and the area between it and the plate is also filled with the material of the seal. The diameter of the broadened area of the pin is greater than the diameter of the aperture.

The seal is formed by subjecting the parrs to a melting temperature for the seal material while applying a force thereto while the parts are in a mold.

The instant seal exhibits increased resistance to breakage while the broadened terminal pin head increases the contact area available for the end user.

DESCRIPTION OF THE PREFERRED EMBODIMENTS

For a better understanding of the present invention, together with other and further objects, advantages and capabilities thereof, reference is made to the following disclosure and appended claims taken in conjuction with the above-described drawings.

Figure 1:
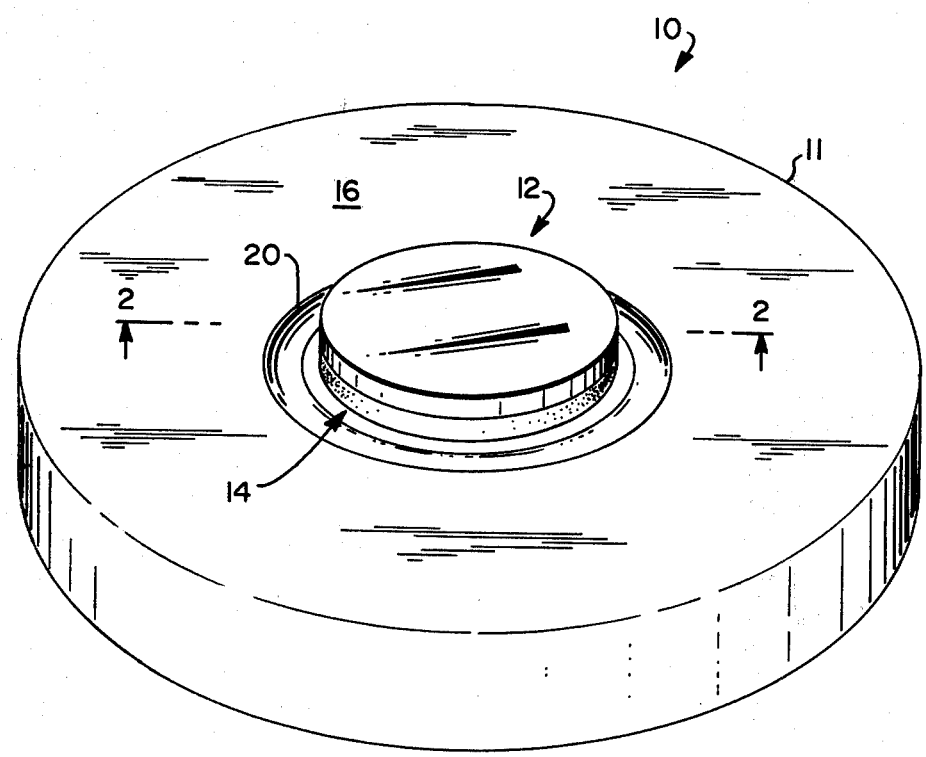
FIG. 1 is a perspective view of an electrochemical cell embodying the invention.

Referring now to the invention with greater particularity there is shown in FIG. 1 an electrochemical cell 10 of the type known as a button cell. Cell 10 comprises a hollow metal body 11 of a suitable material and contains a terminal pin 12 affixed therein by means of a glass-to-metal seal 14. The terminal pin 12 and at least the area of body 11 immediately surrounding seal 14 are preferably formed from a glass sealing alloy such as Rodar or Kovar, materials comprising essentially about 29% Ni, 17% Co, and the balance Fe. The sealing glass preferably comprises a mixture of a hard sealing glass such as Corning Glass Works No. 7052 and alumina ($Al_2O_3$) in the ratio of 3:1. This mixture is also available commercially as Corning Glass Works No. 9119. Other glasses and sealing alloys may be employed so long as their coefficients of thermal expansion are substantially compatible.

Figure 2:
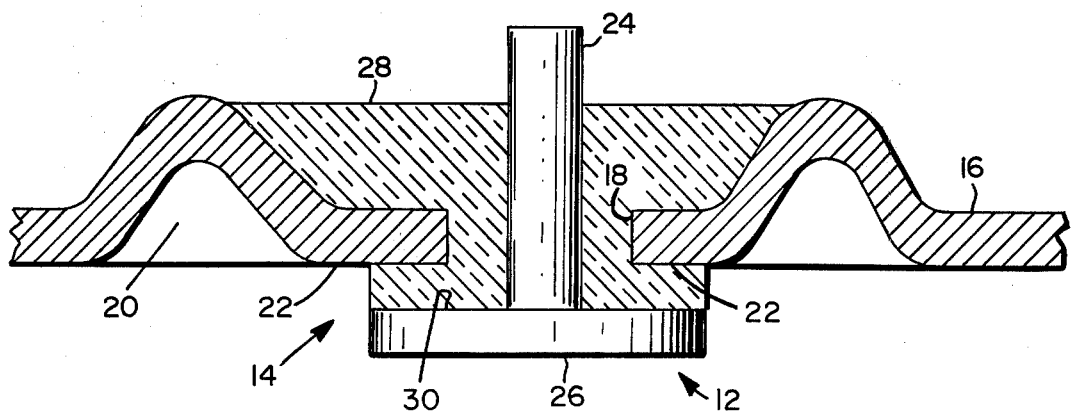
FIG. 2 is a sectional view taken along the line 2—2 of FIG. 1, but inverted with respect to FIG. 1.

The seal 14 can be more clearly understood by reference to FIG. 2, which is inverted with respect to FIG. 1. Herein, it will be seen that seal 14 is formed in an apertured plate 16 which can be the cover portion of body 11. The aperture 18 therein has a given diameter and is surrounded by an annular concavo-convex relief ring 20 with the convex portion interior of the cell. At least the area 22 of plate 16 surrounding aperture 18 is planar. Terminal pin 12 is positioned substantially centrally of aperture 18 and has a first diametered longitudinally extending portion 24 and a second diametered portion 26 formed at one end thereof external of cell 10. The first diametered portion 24 is smaller than aperture 18 and the second diametered portion 26 is larger than aperture 18 and is spaced therefrom.

The sealing material 28 fills the space defined by the relief ring 20, surrounds terminal pin portion 24, projects through aperture 18 and encompasses surface 30 of terminal pin portion 26. The seal is preferably formed in a reducing atmosphere as taught in Ser. No. 840,488, filed Oct. 7, 1977 and assigned to the assignee of the instant invention; the teachings thereof being herein incorporated by reference.

This novel seal provides many advantages over the prior art. The combination of the relief ring with the final shape of the glass seal, which extends on both sides of the plate 16, gives greatly increased strength by allowing a certain amount of flexure to plate 16. Further, the additional area of terminal pin portion 26 aids in this strengthening feature as well as providing increased contact area.

Figure 3:
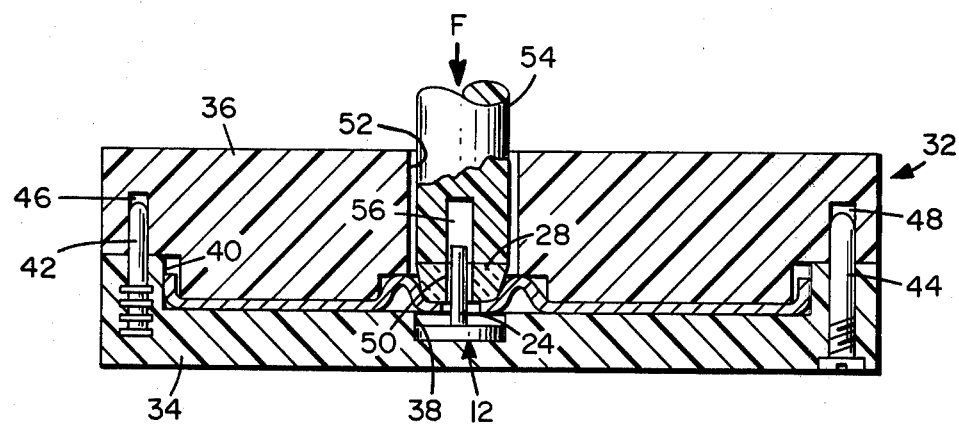
FIG. 3 is a sectional view illustrating a step in the manufacture of the seal.
Figure 4:
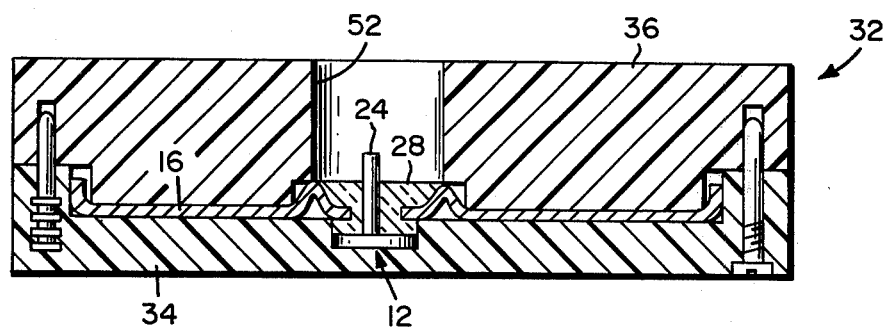
FIG. 4 is a similar view at the completion of manufacture.

The utilization of this novel seal requires a novel method of construction which is illustrated in FIGS. 3 and 4. Referring thereto it will be seen that the seal is consumated in a mold 32 which comprises a female half 34 and a male half 36, preferably of carbon.

The female half 34 is provided with a first depression 38 for receiving the second diametered portion 26 of tack shaped terminal pin 12, and a second depression 40 for receiving plate 16. Suitable mold aligning pins 42, 44 are provided in one of the halves of the mold, for example 34, to mate with apertures 46, 48 in the other half. The pins can be molded into the mold as in pin 42 or threaded thereinto, as is pin 44.

Terminal pin 12 is suitably placed in depression 38 and plate 16 is placed in depression 40. Male mold half 36 which contains a bore 52 aligned with relief ring 20 is then fitted to female mold 34.

Sealing material 28 in the form of a frustum having an aperture 50 therethrough is then placed, through bore 52, within the space defined by relief ring 20 with portion 24 of pin 12 extending within aperture 50.

A piston 54 is then placed within bore 52 to rest upon sealing collett 28. Piston 54 is provided with a bore 56 to accommodate terminal pin portion 24.

This assembly is then heated within a furnace to a temperature of about 1050° C. for 16 minutes while a force of 3.5 lbs/in.$^2$ is applied to piston 54 to cause glass flow and bonding to take place. The force is necessary to achieve glass flow through aperture 18 and into the space defined by surfaces 22 and 30. Bonding of the parts, of course, also takes place at this time.

It will be seen that there is herein provided a novel seal construction as well as a novel method of making the seal. The seal is more resistant to breakage and provides a better contact area than those used heretofore.

While there has been shown and described what are at present considered the preferred embodiments of the invention, it will be obvious to those skilled in the art that various changes and modifications may be made therein without departing from the scope of the invention as defined by the appended claims.

What is claimed is:

1. A glass-to-metal seal for an electrochemical cell terminal comprising: an apertured metal plate, said aperture having a given diameter; a relief ring formed in said plate surrounding said aperture and spaced therefrom so that the area of said metal plate adjacent said aperture is substantially planar; a metal terminal pin having a first diametered, longitudinally extending portion substantially centrally located within said aperture, said first diametered portion being smaller than said given diameter, and a second diametered portion formed at one end thereof, said second diametered portion being larger than said given diameter and being longitudinally spaced therefrom; and a sealing material selected from the group of sealing glasses, ceramics and mixtures thereof sealingly filling the area between said relief ring, said aperture and said second diametered portion of said terminal pin.

2. The seal of claim 1 wherein said relief ring comprises an annular depression.

3. The seal of claim 2 wherein said apertured metal plate and said metal terminal pin are formed from a glass sealing alloy selected from the group of materials comprising essentially about 29% nickel, 17% cobalt and the balance iron.

* * * * *